Nov. 16, 1926.						1,606,980
T. VICARS
BISCUIT, BREAD, AND THE LIKE MACHINERY
Filed Dec. 12, 1923    2 Sheets-Sheet 2

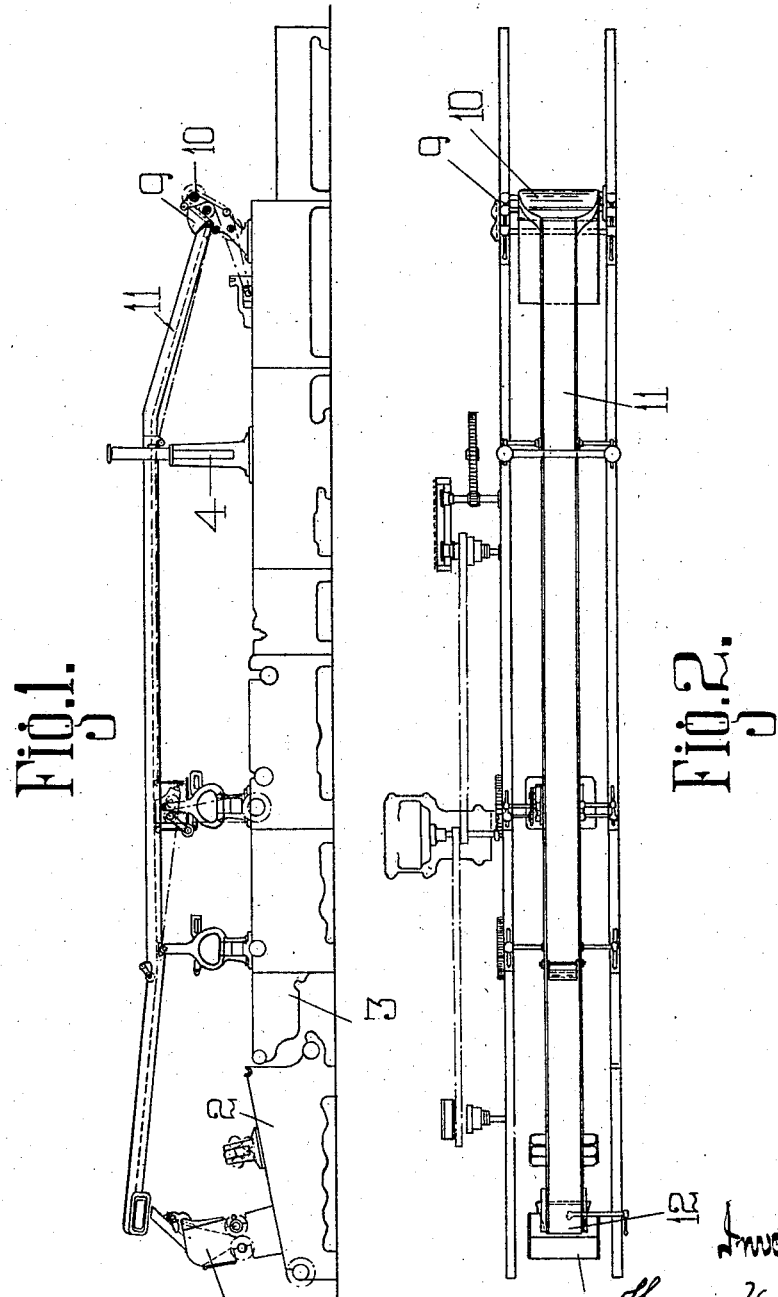

Inventor
Thomas Vicars
By
Sturtevant + Mason
Attorneys

Patented Nov. 16, 1926.

1,606,980

UNITED STATES PATENT OFFICE.

THOMAS VICARS, OF EARLESTOWN, ENGLAND.

BISCUIT, BREAD, AND THE LIKE MACHINERY.

Application filed December 12, 1923, Serial No. 680,210, and in Great Britain November 2, 1923.

The present invention relates to improvements in biscuit, bread or the like machinery operating upon a sheet of plastic material such as dough, in which measured quantities are removed from the thin sheet of dough or the like material by stamps or other cutting devices, whereupon the reticulated sheet left after the removal of the cut-away portions is passed to a collecting receptacle to be again kneaded up and formed with fresh dough into a sheet of material to be subsequently acted upon by the cutting devices.

According to the present invention, the waste dough in the form of the reticulated sheet is folded one or a number of times upon itself to present the minimum surface on its return journey to the hopper.

By this means it is insured that the waste dough is kept as fresh as possible against the effects of evaporation from its surface, and secondly, where the machine is working in a closed cycle, that is to say that the waste dough from one end of the machine is returned to the other opposite end to again pass through the machine with fresh material. The return conveyor if lying above the normal table or bed of the machine need only be a fraction of the width of this, and consequently does not interfere with the head room or light required on the main operating table or bed.

The invention is more particularly described with reference to the accompanying drawings (diagrammatic) in which:—

Figure 1 is a side elevation of a biscuit making machine taken by way of example.

Figure 2 is a corresponding plan view.

Figure 3:
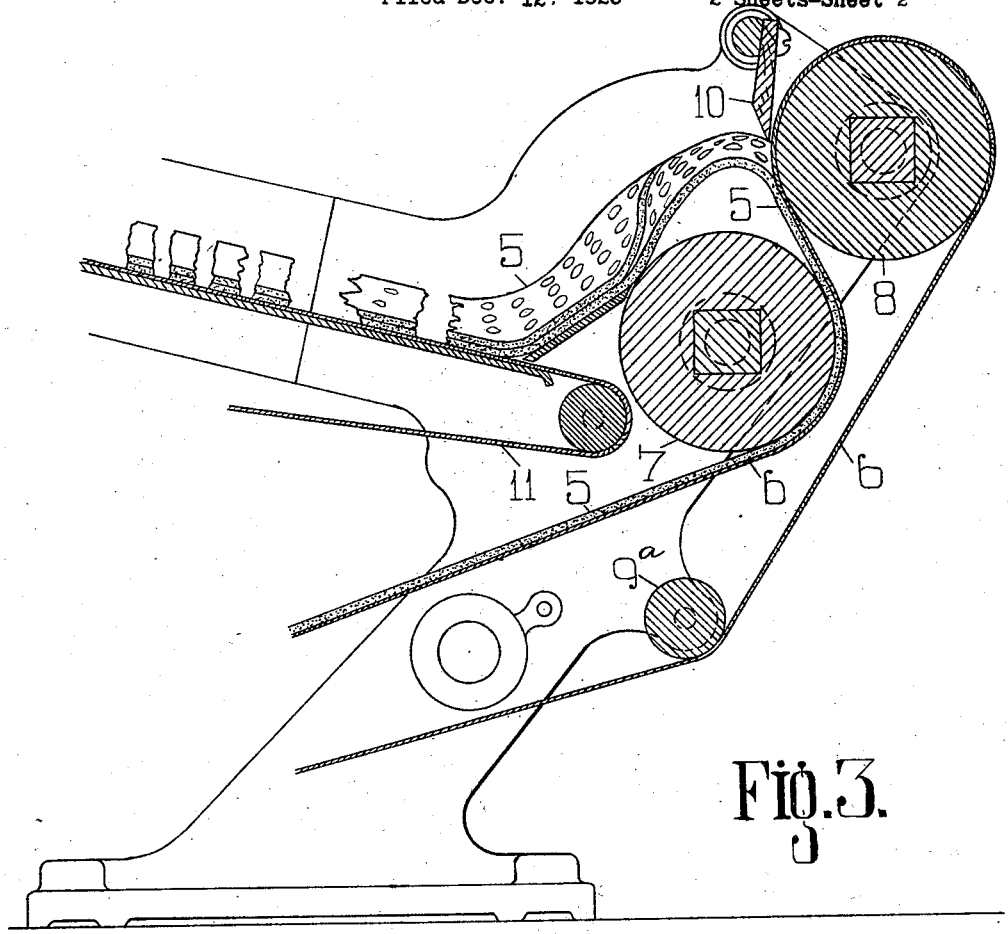
Figure 3 is a detail of the delivery end on a somewhat enlarged scale.
Figure 4:
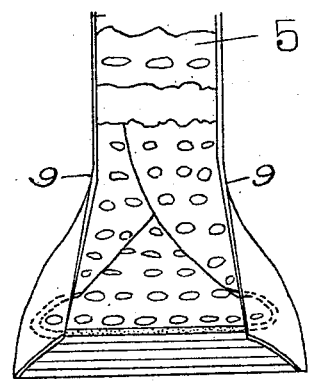
Fig. 4 is a sectional view of the dough sheet as it passes on to the return conveyor.

Dough is passed from a hopper 1 of the table 2, and then to the main operating bed of the machine 3, on which it is spread out as a thin sheet, and eventually passes out under automatic cutters stamping out from the thin sheet of plastic material measured portions in the form of biscuits, buns or the like, these passing away to the delivery table whilst the waste in the form of a reticulated sheet 5 is passed upwards by means of a conveyor 6 over guide rollers 7 and 8, from which latter it is removed by a doctor or scraper 10 lying at the base of a feed plate having curved side cheeks 9 adapted to fold over the reticulated sheet of dough one or more times upon itself to fall eventually upon a receiving conveyor 11 which, as shown, need only therefore be a fraction of the width of the main bed-plate 3 of the machine. Consequently the advantage is obtained that a much less surface of the dough is exposed in the operation of returning this waste dough to a receiving receptacle 12 which is particularly important in a machine of the type illustrated in which the waste from one machine passes back along the whole length of the machine to the front end of the machine to be mixed up with fresh dough and then pass again down the machine in a continuous cycle. The conveyor 6 returns from roller 8 over a guide roller 9ᵃ to the front of the machine.

It will also be noticed that owing to this lesser surface of the return sheet the return feed conveyor 11 can conveniently be arranged above the main bed of the machine, and yet will not shroud the bed from light.

It is preferred that the returning conveyor 11 be driven at a higher rate of speed than the delivery conveyor 6 whereby the material 5 becomes split up into a number of separate lumps which provide for a more even feed of the waste dough, back into the hopper 1.

The conveyor delivering the return dough is arranged to swivel from side to side of the hopper so as to further allow an even distribution of returned dough into said hopper.

I declare that what I claim is:—

1. A method of handling waste dough or the like plastic material subject to deterioration on exposure, in which the waste dough in the form of a sheet is folded upon itself to give the minimum of surface, and which when so folded is split up into a plurality of small pieces.

2. A method of handling waste dough or the like plastic material subject to deterioration on exposure, in which the waste dough in the form of a sheet is folded upon itself to give the minimum surface and which when so folded is split up into a plurality of small pieces and when so split up is delivered at a greater rate of speed than the delivery speed of the waste dough.

3. A machine for operating on plastic material subject to deterioration on exposure comprising means for forming the plastic material into a thin sheet, means for removing measured quantities from said sheet, means for passing the reticulated sheet remainder to folding devices, means to fold said sheet and means for removing said reticulated folded sheet to a storage hopper.

4. A machine for operating on plastic material subject to deterioration on exposure comprising means for forming the plastic material into a thin sheet, means for removing measured quantities from said sheet, means for passing the reticulated sheet remainder to folding devices, means to fold said sheet and conveying means for receiving said folded reticulated sheet, and means for driving said conveying means at a greater rate than the speed of delivery of said reticulated sheet.

5. A machine for operating on sheet plastic material comprising a bed cutting device operating on the sheet material on said bed, and a return conveyor above said bed of lesser width than said bed for returning the waste reticulated material to the opposite end of the machine.

6. A machine for operating on waste dough and the like plastic material in the form of reticulated sheets and subject to deterioration on exposure, comprising a folder receiving the waste dough in sheet form at a predetermined speed and discharging the waste dough in laterally folded sheet form of reduced exposed surface, and a withdrawal conveyor to remove said folded sheet from said folder at a speed greater than the speed of reception at said folder, whereby said folded sheet is split into a plurality of small pieces.

7. A machine for operating on dough and the like plastic materials subject to deterioration on exposure, comprising means to form a thin sheet, means to remove portions from said sheet and to form a reticulated sheet of waste material, means to fold said reticulated sheet laterally upon itself to reduce the exposed surface, said sheet during said forming, removing and folding being forwarded at a predetermined rate of speed and means to convey said sheet from said folding means to said forming means at a rate of speed greater than the speed of its reception at said folder, whereby said sheet is exposed to the atmosphere for but a short time, and is split into a plurality of small pieces.

8. A machine for operating on dough and the like plastic material in the form of reticulated sheets and subject to deterioration on exposure, comprising means to form said material into a sheet, means to remove portions from said sheet and reticulate the same, means to fold said reticulated sheet, said sheet travelling at a predetermined speed from said forming means through said folding means, and means to return said folded sheet to said forming means at a rate of speed greater than the speed of movement from said forming means to said folding means and to split said sheet into a plurality of small pieces.

In witness whereof, I have hereunto signed my name this 24th day of November, 1923.

THOMAS VICARS.